US012191559B2

(12) United States Patent
Liu et al.

(10) Patent No.: US 12,191,559 B2
(45) Date of Patent: Jan. 7, 2025

(54) BASE STATION ANTENNAS INCLUDING RADIATING ELEMENTS HAVING TILTED DIPOLES

(71) Applicant: Outdoor Wireless Networks LLC, Claremont, NC (US)

(72) Inventors: Qiang Liu, Suzhou (CN); Changfu Chen, Suzhou (CN); Rongrong Zhang, Suzhou (CN); Yuemin Li, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 132 days.

(21) Appl. No.: 18/025,295

(22) PCT Filed: Sep. 1, 2021

(86) PCT No.: PCT/US2021/048603
§ 371 (c)(1),
(2) Date: Mar. 8, 2023

(87) PCT Pub. No.: WO2022/055764
PCT Pub. Date: Mar. 17, 2022

(65) Prior Publication Data

US 2024/0030591 A1 Jan. 25, 2024

(30) Foreign Application Priority Data

Sep. 9, 2020 (CN) ......................... 202010939062.4

(51) Int. Cl.
*H01Q 1/24* (2006.01)
*H01Q 19/10* (2006.01)
*H01Q 21/06* (2006.01)

(52) U.S. Cl.
CPC ........... *H01Q 1/246* (2013.01); *H01Q 19/108* (2013.01); *H01Q 21/06* (2013.01)

(58) Field of Classification Search
CPC ...... H01Q 1/246; H01Q 19/108; H01Q 21/06; H01Q 19/104; H01Q 21/062; H01Q 3/06; H01Q 21/26; H01Q 1/36; H01Q 15/14
See application file for complete search history.

(56) References Cited

U.S. PATENT DOCUMENTS

2007/0030208 A1 2/2007 Linehan
2011/0175782 A1* 7/2011 Choi ...................... H01Q 21/24
343/798

(Continued)

OTHER PUBLICATIONS

"Notification of Transmittal of the International Search Report and the Written Opinion of the International Searching Authority, or the Declaration for corresponding International Application No. PCT/US2021/048603, mailing date: Dec. 9, 2021 (14 pages)".

*Primary Examiner* — David E Lotter
(74) *Attorney, Agent, or Firm* — Myers Bigel, P.A.

(57) ABSTRACT

A base station antenna that may include radiating elements having tilted dipoles. For example, a base station antenna may include a reflector and a plurality of radiating elements, each radiating element mounted on the front surface of the reflector and having a support stalk and at least one dipole mounted to the support stalk. The radiating elements include a plurality of first radiating elements configured to operate in a first operating frequency band, and arranged in one or more first columns extending along a first direction; and a plurality of second radiating elements, configured to operate in a second operating frequency band different from the first operating frequency band, and arranged in one or more second columns extending along the first direction. At least one dipole of a first of the second radiating elements in at least one of the second columns is tilted around the first direction.

17 Claims, 10 Drawing Sheets

(56) References Cited

U.S. PATENT DOCUMENTS

| | | | | |
|---|---|---|---|---|
| 2012/0280878 | A1* | 11/2012 | Timofeev ............... | H01Q 1/246 |
| | | | | 343/793 |
| 2016/0285149 | A1* | 9/2016 | Au ........................... | H01Q 1/42 |
| 2020/0136689 | A1 | 4/2020 | Bisiules et al. | |

* cited by examiner

BASE STATION ANTENNAS INCLUDING RADIATING ELEMENTS HAVING TILTED DIPOLES

CROSS-REFERENCE TO RELATED APPLICATIONS

The present application is a 35 U.S.C. § 371 national stage application of PCT Application No. PCT/US2021/048603, filed on Sep. 1, 2021, which claims the benefit of priority to Chinese Patent Application No. 202019039062.4, filed on Sep. 9, 2020, and the entire contents of the above-identified applications are incorporated by reference as if set forth herein.

TECHNICAL FIELD

The present disclosure generally relates to the field of antennas and, more specifically, to base station antennas that include radiating elements with tilted dipoles.

BACKGROUND

Cellular communications systems are well known in the art. In a cellular communications system, a geographic region is divided into a series of areas, called cells, which are served by corresponding base stations. Each base station may include one or more base antennas that are configured to provide two-way radio frequency ("RF") communications for fixed and mobile subscribers located in the cells served by the base station. The base station antenna may include a plurality of antenna arrays, with each of the antenna arrays including multiple radiating elements; when the antenna is installed for use, the radiating elements are arranged in one or more generally vertical columns. In this document, "vertical" means the direction perpendicular to the horizontal plane defined by the horizon. Base station antennas are often installed on towers, where the radiation pattern generated by the base station antenna (also referred to herein as an "antenna beam") points outward. Many cells are divided into "sectors". In perhaps the most common configuration, a hexagonal cell is divided into three 120° sectors, and each sector is served by one or more base station antennas. However, in some cases, the antenna beam may exhibit high levels of squint which prevents the antenna beam from providing coverage throughout the entirety of its intended coverage area thereby affecting the service performance of the cell, particularly at the edges of the cell.

SUMMARY

According to an aspect of the present disclosure, a base station antenna is provided which includes a reflector and a plurality of radiating elements, wherein each radiating element is installed on the front surface of the reflector and has a support stalk and at least one dipole mounted to the support stalk; the plurality of radiating elements comprise: a plurality of first radiating elements that are configured to operate in a first operating frequency band and arranged in one or more first columns extending along the first direction; and a plurality of second radiating elements that are configured to operate in a second operating frequency band that is different from the first operating frequency band, and are arranged in one or more second columns extending along the first direction, wherein the at least one dipole of a first of the second radiating elements in at least one of second columns of the one or more second columns is tilted around the first direction.

In some embodiments, the support stalk of the first of the second radiating elements has an inclined bottom surface, and the first of the second radiating elements is mounted on the front surface of the reflector via the inclined bottom surface.

In some embodiments, the inclined bottom surface includes one or more sloped portions, each of which has a corresponding inclination angle and orientation, and the first of the second radiating elements is mounted on the front surface of the reflector through one of the one or more sloped portions.

In some embodiments, the support stalk of the first of the second radiating elements has an inclined top surface, and the at least one dipole of the first of the second radiating elements is mounted to the said inclined top surface of the said support stalk.

In some embodiments, the inclined top surface includes one or more sloped portions, each of which has a corresponding inclination angle and orientation, wherein the at least one dipole of the first of the second radiating elements is installed to one of the one or more sloped portions.

In some embodiments, the first of the second radiating elements further includes an inclining element which is configured as such that the at least one dipole of the first of the second radiating elements is tilted around the first direction.

In some embodiments, the inclining element includes a sloped element disposed at the bottom surface of the support stalk of the first of the second radiating elements, and the first of the second radiating elements is mounted on the front surface of the reflector through the sloped element.

In some embodiments, the sloped element provides an inclined surface including one or more sloped portions, wherein each sloped portion has a corresponding inclination angle and orientation, and the first of the second radiating elements is mounted on the front surface of the reflector through one of the one or more sloped portion.

In some embodiments, the inclination angle of the sloped element is adjustable.

In some embodiments, the inclining element includes a sloped element provided at the top surface of the support stalk of the first of the second radiating elements, and the at least one dipole of the first of the second radiating elements is mounted on the support stalk via the sloped element.

In some embodiments, the sloped element provides an inclined surface including one or more sloped portions, each of which having a corresponding inclination angle and orientation, wherein the first of the second radiating elements is mounted on the support stalk via one of the one or more sloped portions.

In some embodiments, the inclination angle of the sloped element is adjustable.

In some embodiments, a part of the front surface of the reflector where the at least one second column is installed is tilted around the first direction with respect to the remaining part of the front surface of the reflector.

In some embodiments, the at least one second column includes the outermost second column among the one or more second columns.

In some embodiments, the at least one dipole of the first of the second radiating elements is tilted around the first direction so that a line defined by the at least one dipole of the first of the second radiating elements forms an angle with respect to a plane defined by the first direction and a second direction transverse to the first direction.

In some embodiments, each radiating element is a crossed dipole radiating element that includes a total of two dipoles, wherein the dipoles of the first of the second radiating elements are tilted around the first direction, so that a plane defined by the dipoles of the first of the second radiating elements forms an angle with respect to a second direction transverse to the first direction.

In some embodiments, the at least one dipole of each first radiating element in at least one of the one or more first columns are tilted around the said first direction.

In some embodiments, the angle and/or orientation at which the at least one dipole of the first of the second radiating elements is tilted around the first direction depends on a difference between a pointing direction of a main beam radiated by the first of the second radiating elements and a normal direction of the base station antenna in an azimuth plane in a case where the at least one dipole is not tilted.

In some embodiments, the at least one dipole of each radiating element is formed by a printed circuit board that is mounted to the support stalk of the radiating element.

In some embodiments, the second operating frequency band is higher than the first operating frequency band and does not overlap with the first operating frequency band.

In some embodiments, the at least one dipole of the second radiating elements in the at least one second column are tilted around the first direction toward a direction where a nearest first column is located.

According to another aspect of the present disclosure, a base station antenna is provided, which comprises a reflector and a plurality of radiating elements, wherein each radiating element is mounted on a front surface of the reflector and has a support stalk and a pair of dipoles mounted to the support stalk; and the plurality of radiating elements include: a plurality of low-band radiating elements that are configured to operate in a low-frequency band and arranged in one or more first columns extending along a first direction; and a plurality of high-band radiating elements that are configured to operate in a high-frequency band higher than the low-frequency band, and are arranged in one or more second columns extending along the first direction, wherein the dipoles of the high-band radiating elements in at least one of the one or more second columns are tilted around the first direction toward a direction where a nearest first column is located.

Through the following detailed descriptions of exemplary embodiments of the present disclosure by the accompanying drawings, other features and advantages of the present disclosure will become clearer.

BRIEF DESCRIPTION OF THE DRAWINGS

The foregoing and other features and advantages of the present disclosure will become clear from the following descriptions of the embodiments of the present disclosure shown in conjunction with the accompanying drawings. The accompanying drawings are incorporated herein and form a part of the descriptions to further explain the principles of the present disclosure and enable those skilled in the art to make and use the present disclosure. Where.

Figure 1:
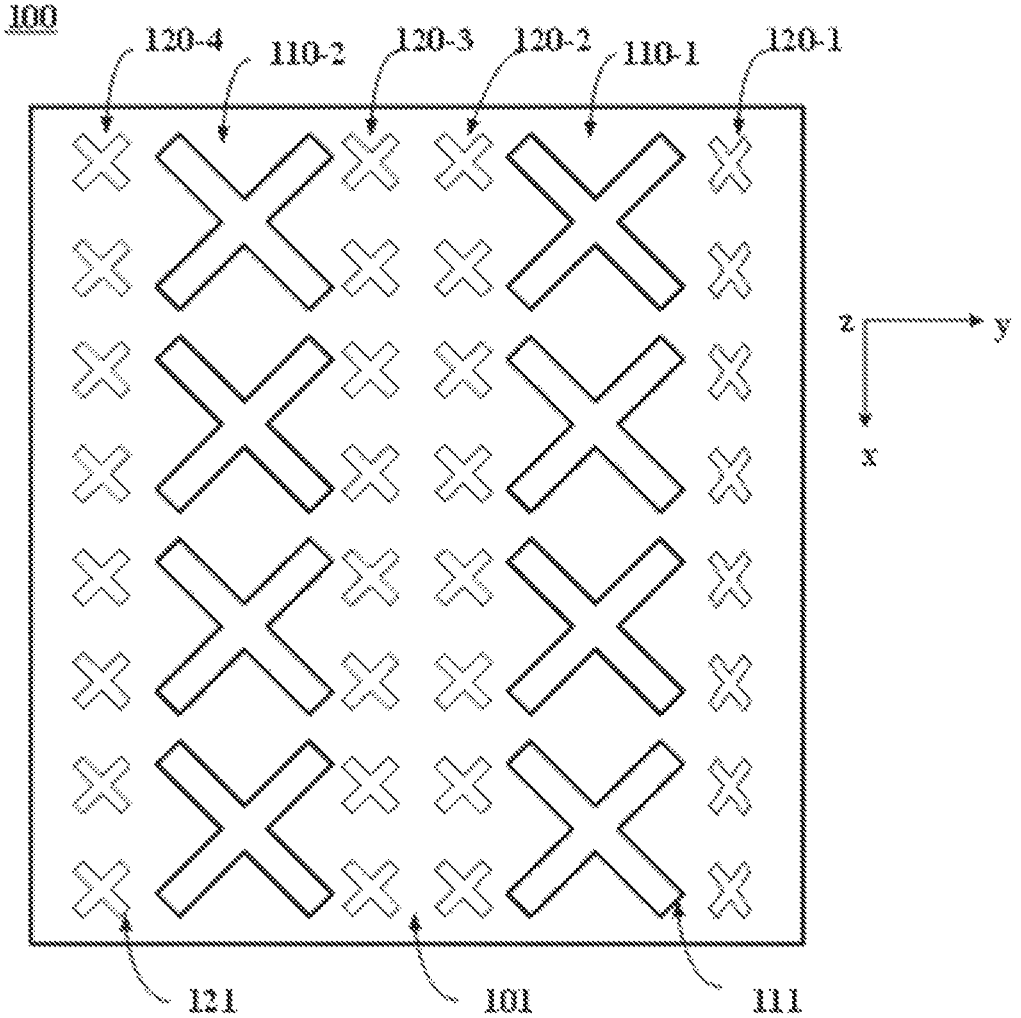
FIG. 1 is a schematic front view of a base station antenna according to some embodiments of the present disclosure.

Note, in the embodiments described below, the same signs are sometimes used in common between different drawings to denote the same parts or parts with the same functions, and repeated descriptions thereof are omitted. In some cases, similar labels and letters are used to indicate similar items. Therefore, once an item is defined in one figure, it may not be further discussed in subsequent figures.

For ease of understanding, the position, size, and range of each structure shown in the drawings and the like may not indicate the actual position, size, and range. Therefore, the present disclosure is not limited to the positions, dimensions, and ranges disclosed in the drawings and the like.

DETAILED DESCRIPTION

Various exemplary embodiments of the present disclosure will be described in detail below with reference to the accompanying drawings. It should be noted: Unless otherwise specifically stated, the relative arrangement, numerical expressions and numerical values of components and steps set forth in these embodiments do not limit the scope of the present disclosure.

The following description of at least one exemplary embodiment is merely illustrative, and in no way serves as any limitation to the present disclosure and its application or use. In other words, the structure and method herein are shown in an exemplary manner to illustrate different embodiments of the structure and method in the present disclosure. However, those skilled in the art will understand that they only illustrate exemplary ways of implementing the present disclosure, rather than exhaustive ways. In addition, the drawings are not necessarily drawn to scale, and some features may be enlarged to show details of specific components.

In addition, the technologies, methods, and equipment known to those of ordinary skill in the art may not be discussed in detail, but where appropriate, the said technologies, methods, and equipment should be regarded as part of the granting descriptions.

In all examples shown and discussed herein, any specific value should be construed as merely exemplary and not as limiting. Therefore, other examples of the exemplary embodiment may have different values.

Antenna beams formed by base station antennas are typically designed to have a specified coverage area, meaning an area where the antenna beam provides sufficient gain that RF transmission with suitable quality of service can be established between the base station and the users (and specifically, their electronic equipment) within the coverage area. The coverage area is typically defined in the azimuth or horizontal plane, such that the coverage area for a base station antenna (or an array of radiating elements thereof)

may correspond to a geographic region. Antenna beams may exhibit a phenomena referred to as "squint," which corresponds to a rotation or tilting in the direction of the antenna beam. The squint of the antenna beam, especially the squint of the antenna beam in the azimuth plane, may cause the actual coverage of the antenna beam to deviate from the expected coverage.

Figure 8:
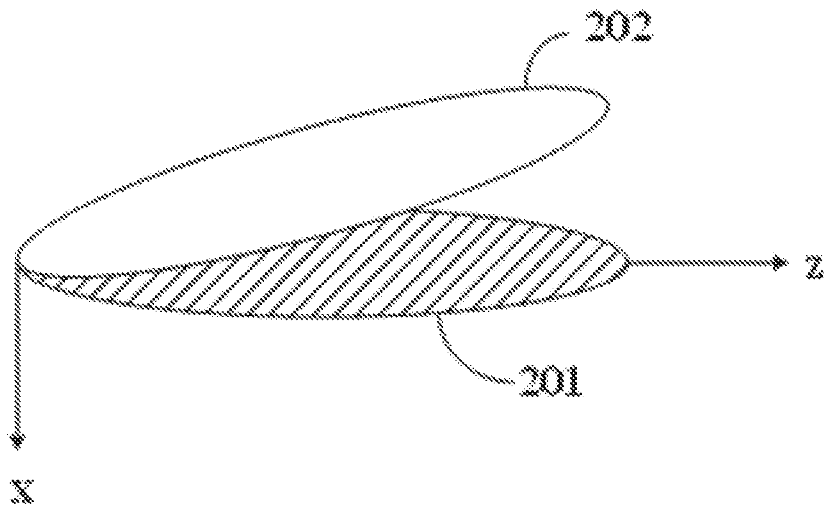
FIG. 8 is a schematic diagram illustrating the effect of antenna beam squint on antenna beam coverage.

For example, FIG. 8 schematically illustrates how antenna beam squint affects the coverage of an antenna beam. In FIG. 8, the x direction is the vertical direction, which can be defined as the direction perpendicular to the horizontal plane defined by the horizon, and it is assumed that the base station antenna extends along the x direction (i.e., is installed vertically). The z direction is the depth direction of the base station antenna (which is also referred to herein as the "normal" direction), and hence is perpendicular to the x direction. Azimuth beam squint refers to the difference between the actual pointing direction of the main beam in the azimuth plane and the normal direction of the base station antenna. For example, the pointing direction of the main beam can be determined by the position of the bisector of the beam width of the antenna beam pattern at 10 dB, and the deflection of the pointing direction of the main beam thus defined relative to the normal direction of the base station antenna in the azimuth plane may be referred to herein as 10 dB azimuth beam squint.

Referring to FIG. 8, ideally, when there is no azimuth beam squint, the pointing direction of the main beam in the azimuth plane coincides with the normal direction of the base station antenna, and then the coverage area of the antenna beam should be area 201. If azimuth beam squint is generated due to factors such as, for example, the mutual influence between the radiating elements included in the antenna array, then the actual coverage area will be area 202, which worsens the service performance in the cell. In particular, the service performance in an area adjacent to the boundary of the corresponding sector will be degraded.

In some multi-band antenna applications, antenna arrays may be included in the antenna that operate in both a low frequency band and in a high frequency band. The low frequency band can be a frequency range such as 600-960 MHz, and the high frequency band may be a frequency range such as 1695-2690 MHz. The antenna arrays operating in the low frequency band may include low-band radiating elements and the antenna arrays operating in the high frequency band may include high-band radiating elements. The low-band radiating elements and the high-band radiating elements may each include a support stalk and a dipole radiator unit, where the support stalk, is perpendicular to the surface of the reflector. The dipole radiator unit is mounted on the support stalk in front of a reflector of the antenna, and may include a pair of dipoles if the radiating element is a cross-dipole radiating element. Each dipoles includes a pair of dipole arms, which are mounted parallel to the surface of the reflector. Generally, the distance between the dipole radiator unit of the low-band radiating element and the front surface of the reflector is longer than the distance between the dipole radiator unit of the high-band radiating element and the front surface of the reflector, which from the view of the normal direction of the base station antenna, makes the dipole radiator unit of the low-band radiating element appear to cover the dipole radiator unit of the high-band radiating element. This may cause the beam pattern of the high-band radiating element to be deflected toward the direction where there is no low-band radiating element, thereby undesirably affecting the performance of the base station antenna.

The following section will discuss example base station antennas according to some embodiments of the present disclosure in further detail with reference to the accompanying drawings.

Figure 2:
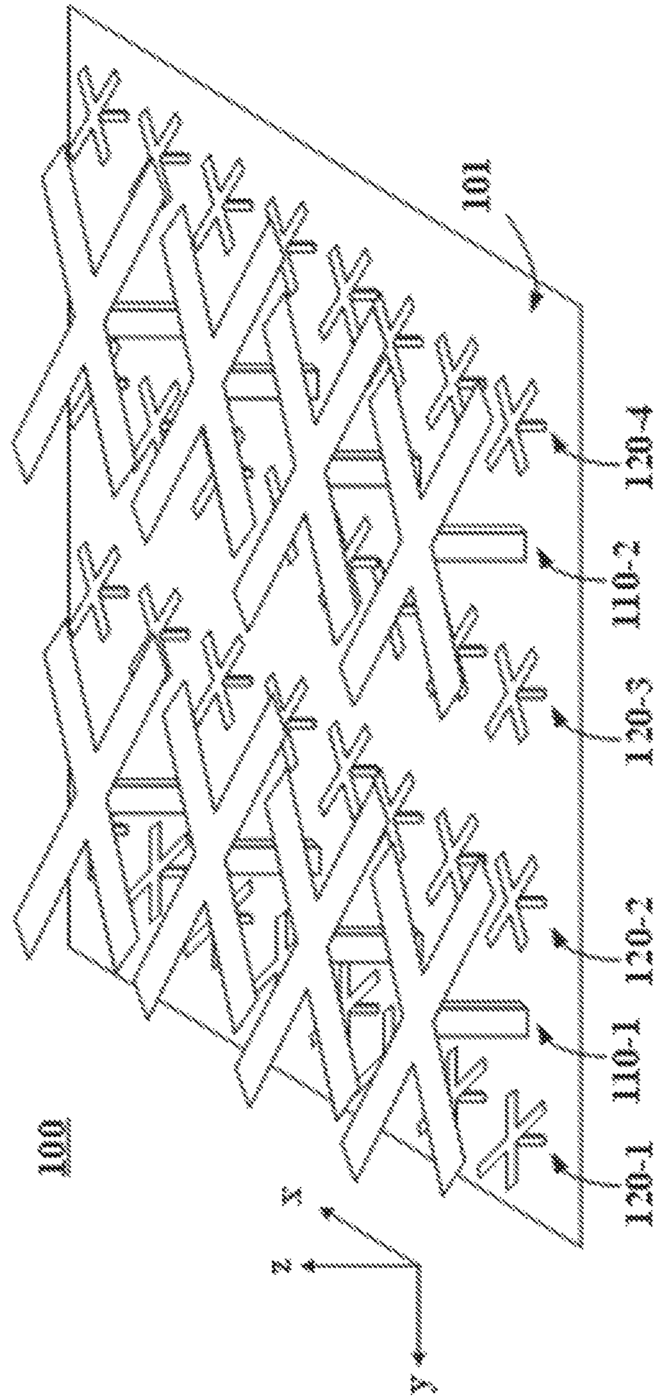
FIG. 2 is a schematic perspective view of the base station antenna according of FIG. 1.
Figure 3:
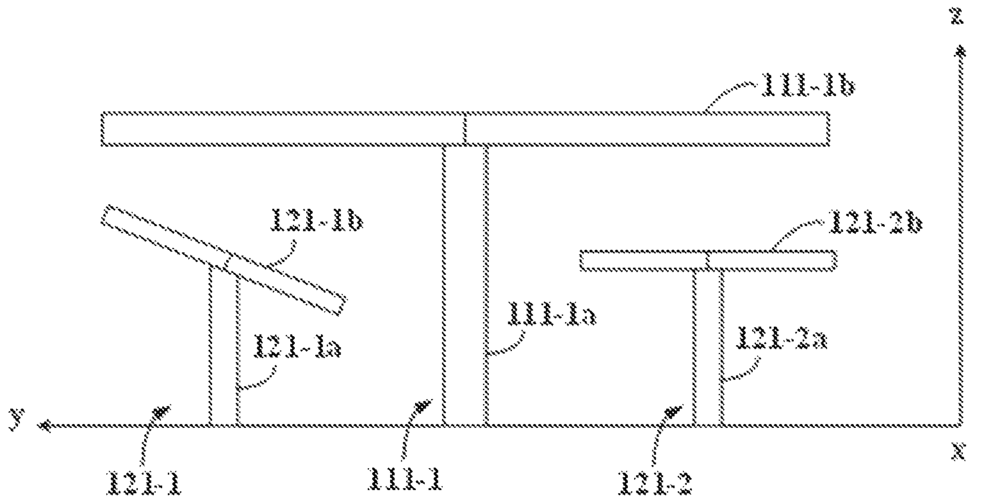
FIG. 3 is a schematic partial top view of the base station antenna of FIG. 1.

FIGS. 1-3 schematically show, respectively, a front view, a perspective view, and a partial top view of a base station antenna 100 according to some embodiments of the present disclosure. As used herein, the x direction may be the direction perpendicular to the horizontal plane defined by the horizon. Therefore, the x direction may indicate the length direction of the base station antenna 100, that is, the base station antenna 100 extends along the x direction. In addition, as used herein, the y direction is transverse to the x direction and indicates the width direction of the base station antenna 100, and the z direction is perpendicular to both the x direction and the y direction and indicates the normal direction of the base station antenna 100. In other words, if the base station antenna 100 were installed perpendicular to the horizontal plane of the horizon (e.g., if the base station antenna 100 were installed vertically), then the top and bottom of the base station antenna 100 are opposite from each other in the x direction, the left and right of the base station antenna 100 are opposite from each other in the y direction, and the front and back of the base station antenna 100 are opposite from each other in the z direction.

It should be noted that the base station antenna may include many additional components that are not discussed herein in order to avoid obscuring the main points of the present disclosure; such other components are also not shown in the accompanying drawings. The accompanying drawings only schematically show the relative positional relationship of various components, and unless otherwise specified, there is no particular limitation on the specific structure of each component. For example, as described herein, "a radiating element that is mounted on a front surface of a reflector" may encompass both mounting the radiating element on the front surface of the reflector either directly or indirectly, with the presence or absence of one or more intervening elements therebetween. For example, the radiating element may be mounted on a feed board which is mounted on the reflector. As a non-limiting example, "a radiating element that is mounted on the reflector" may encompass and include mounting the radiating element on the feed board that is mounted on the reflector.

As shown in FIG. 1, the base station antenna 100 includes a reflector 101 and a plurality of radiating elements. The plurality of radiating elements may include a plurality of first radiating elements 111, which may be configured to operate in the first operating frequency band and may be arranged in one or more first columns 110-1, 110-2 extending along the first direction (x direction). The plurality of radiating elements may further include a plurality of second radiating elements 121, and these second radiating elements 121 may be configured to operate in a second operating frequency band that is different from the first operating frequency band and may be arranged in one or more second columns 120-1, 120-2, 120-3, 120-4 extending along the first direction. Although FIG. 1 illustrates the base station antenna 100 as having two first columns and four second columns, and each first column includes four first radiating elements and each second column includes eight second radiating elements, it is understandable that the base station antenna 100 may include fewer and/or additional columns that operate in the same or different operating frequency bands, and that each column may include more or fewer radiating elements.

In some embodiments, the second operating frequency band may be higher than the first operating frequency band and may not overlap with the first operating frequency band. In some embodiments, the first radiating element may be a low-band radiating element and the first operating frequency band may be a low frequency band, and the second radiating element may be a high-band radiating element and the second operating frequency band may be a high frequency band. In some other embodiments, the first radiating element may be a high-band radiating element and the first operating frequency band may be a high-frequency band, and the second radiating element may be a low-band radiating element and the second operating frequency band may be a low frequency band. In the following description, it is assumed herein that the first radiating element is a low-band radiating element, the first operating frequency band is a low-frequency band, the second radiating element is a high-band radiating element, and the second operating frequency band is a high-frequency band, but it is understandable that the following description will also apply to the circumstance where the first radiating element is a high-band radiating element, the first operating frequency band is a high-frequency band, and the second radiating element is a low-band radiating element, and the second operating frequency band is the low-frequency band. The "low frequency band" used herein may refer to bands of relatively low frequencies such as, for example, the 600-960 MHz band or part thereof, and the "high frequency band" used herein may refer to bands of relatively high frequencies such as, for example, 1695-2690 MHz frequency bands or part thereof. The present disclosure is not limited to these specific frequency bands, and can be applied to any other frequency bands within the operating frequency range of the base station antenna. In addition, the present disclosure is also not limited to base station antennas with two operating frequency bands, and can be applied to base station antennas with more or fewer operating frequency bands.

As can be seen from FIG. 2, each of the plurality of radiating elements of the base station antenna 100 is mounted to extend forwardly from the front surface of the reflector 101, and may include a support stalk and a dipole radiator unit mounted to the support stalk. The dipole radiator unit includes first and second dipoles, each of which comprises a pair dipole arms. Although the radiating element is schematically depicted as a dual-polarized dipole radiating element in FIG. 2 that includes two dipoles (four dipole arms), this is only exemplary and is not intended to limit the present disclosure. For example, FIG. 3 shows a partial top view of the base station antenna 100, which depicts the first radiating element 111-1 in the first column 110-1 and the second radiating element 121-1 in the second column 120-1 and the second radiating element 121-2 in the second column 120-2 that are located respectively at either side of the first radiating element 111-1. The first radiating element 111-1 includes the support stalk **111-1*a* and the dipoles 111-1*b*, the second radiating element 121-1 includes the support stalk 121-1*a* and the dipoles 121-1*b*, and the second radiating element 121-2 includes the support stalk 121-2*a* and the dipoles 121-2*b***.

The support stalk can be used to mount the dipole radiator unit at a suitable distance in front of the reflector of the base station antenna. For example, in order to increase the bandwidth of the radiating element, the dipole radiator unit of the radiating element may be mounted on the support stalk at a distance of more than a quarter wavelength in front of the reflector of the base station antenna, where the wavelength refers to the wavelength corresponding to the center frequency of the operating frequency band of the radiating element. In addition to providing a support structure for the dipole radiator unit, the support stalk may also be used to feed radio frequency (RF) signals to and from the dipole radiator unit. For example, in some embodiments, the support stalk may also be configured as a feeding stalk for feeding a signal to the dipole radiator unit mounted thereon. In other embodiments, the support stalk may be used to properly position one or more separate feeding cables that are used to feed RF signals to the dipole radiator unit. Depending on the function that the support stalk is designed to perform, the support stalk can be made of any suitable material. In some embodiments, the support stalk may be a plastic support stalk. In some embodiments, the support stalk may include one or more printed circuit boards.

In some embodiments, the dipoles of each radiating element are formed on a printed circuit board, and the dipole printed circuit board is mounted on the support stalk.

Conventionally, the front surface of the reflector generally may be flat, the support stalk extends perpendicular to the front surface of the reflector, and the dipoles are mounted on the support stalk to be perpendicular to the support stalk and parallel to the front surface of the reflector. For example, the support stalks of the radiating elements in the columns 110-1, 110-2, and 120-2 to 120-4 in FIG. 2 are perpendicular to the front surface of the reflector 101, and the dipoles mounted on the support stalks may be perpendicular to the support stalk and parallel to the front surface of the reflector 101, and also parallel to the x-y plane.

Figure 5:
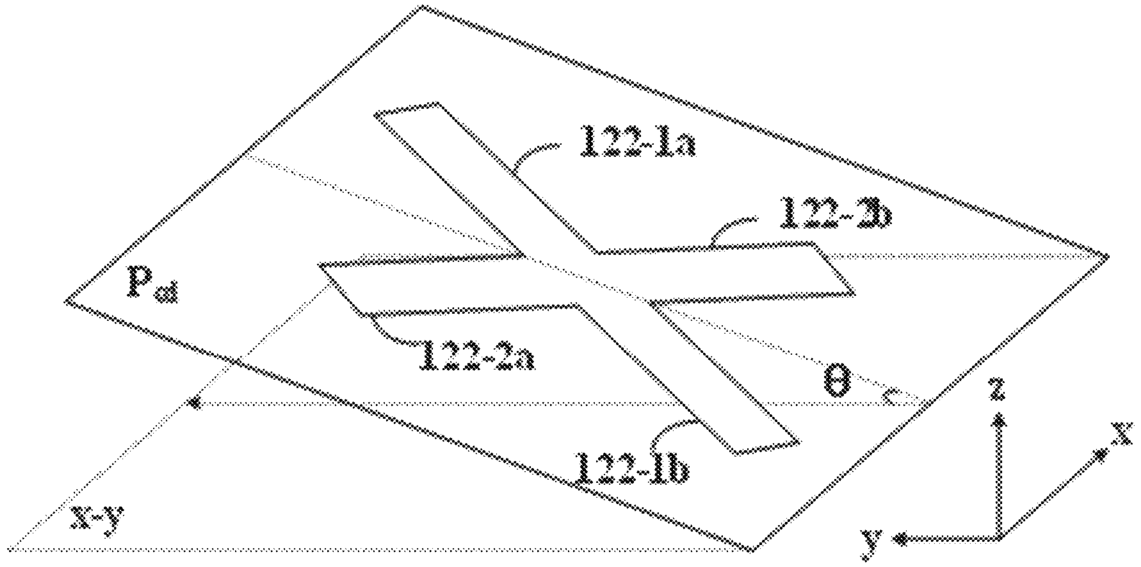
FIG. 5 schematically shows the tilt of the dipoles of the radiating element when the base station antenna is a dual-polarized antenna.
Figure 6:
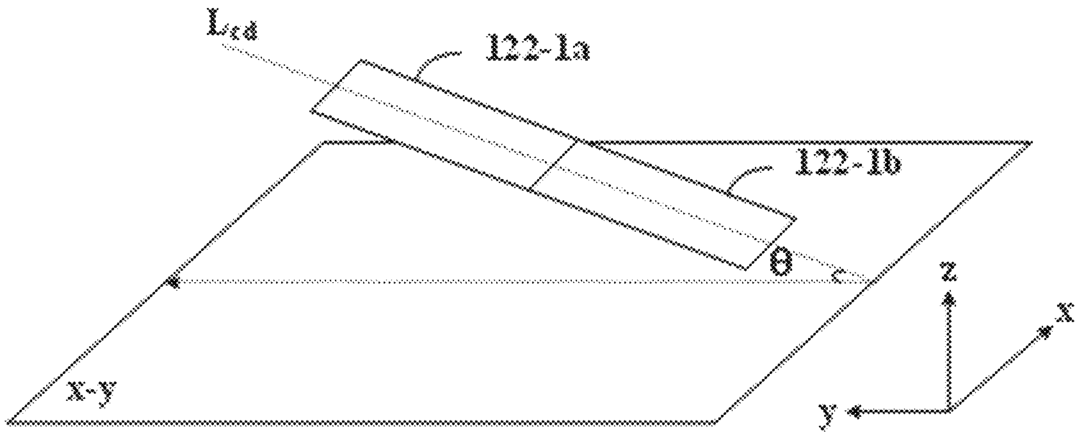
FIG. 6 schematically shows the tilt of the dipoles of the radiating element when the base station antenna is a single-polarized antenna.

Different from the conventional base station antenna, in the base station antenna 100 according to the embodiment of the present disclosure, the dipoles of the second radiating elements in at least one of the second columns included in the base station antenna 100 may be tilted around the first direction. For example, as shown in FIG. 2, the dipoles of the second radiating element 121 in the second column 120-1 are tilted around the x direction. The tilt of the dipoles around the x direction means that the angle of the dipoles relative to the x direction does not change. The following section further describes how the dipoles of the radiating element are tilted around the x direction with reference to FIGS. 5 and 6. In the example shown in FIG. 5, each radiating element is a crossed dipole radiating element, and the crossed dipole radiating element comprises two dipoles, where each dipole includes a respective pair of dipole arms **122-1*a*, 122-1*b*, and 122-2*a*, 122-2*b*, which cross each other. A plane where the dipole arms of the conventional radiating element are located can be parallel to the x-y plane. In contrast, the dipole arms 122-1*a*, 122-1*b*, 122-2*a*, 122-2*b* of the second radiating element 121 in at least one second column 120-1 of the base station antenna 100 are tilted around the x direction (i.e., the first direction) so that the plane Pcd defined by the dipole arms 122-1*a*, 122-1*b*, 122-2*a*, 122-2*b* of the second radiating element 121 forms an angle θ with respect to the y direction (i.e., the second direction transverse to the first direction) or the x-y plane. In the example shown in FIG. 6, each radiating element includes a dipole that comprises a pair of collinear dipole arms 122-1*a*, 122-1*b*, where the dipole arms 122-1*a*, 122-1*b* of the second radiating element 121 in at least one second column 120-1 of the base station antenna 100 are tilted around the x direction (i.e., the first direction) so as the line L cd defined by the pair of dipole arms 122-1*a*, 122-1*b* of the second radiating element 121 forms an angle θ with respect to the x-y plane (i.e., the plane defined by the first direction and the second direction transverse to the first direction). The line Lcd may be, for example, the longitudinal center line of the pair of dipole arms 122-1***a* and 122-1*b*. By tilting the dipoles of the radiating element around the x direction, the beam pattern of the radiating element can be adjusted simply and directly, thereby suppressing the azimuth beam squint.

Figure 4A:
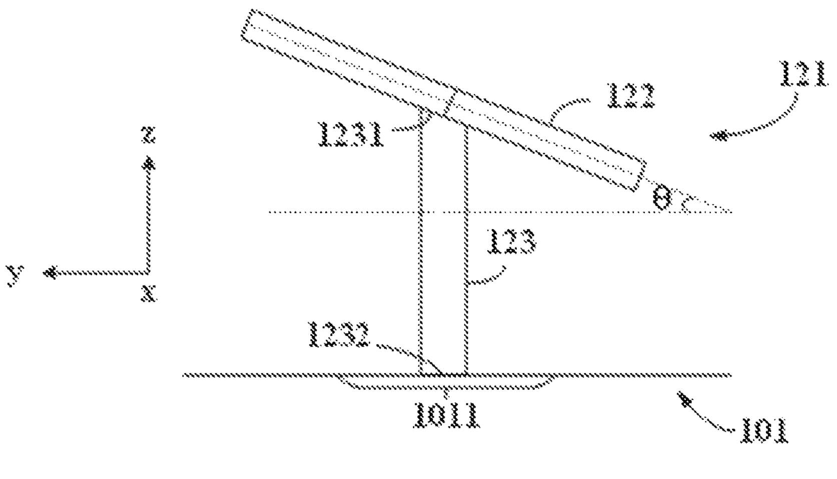
FIGS. 4A-4H are schematic diagrams of example configurations of radiating elements with tilted dipoles that can be used in the base station antennas according to some embodiments of the present disclosure.
Figure 4B:
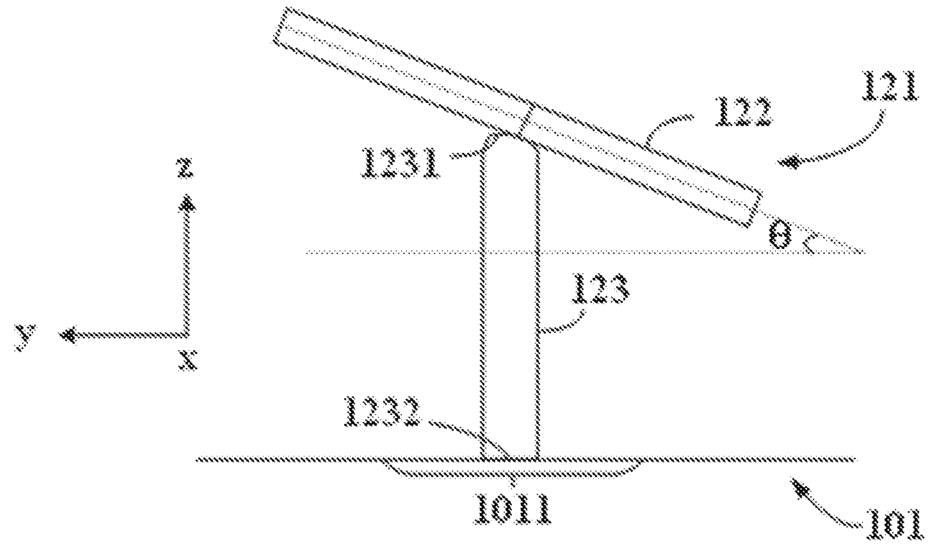
Figure 4C:
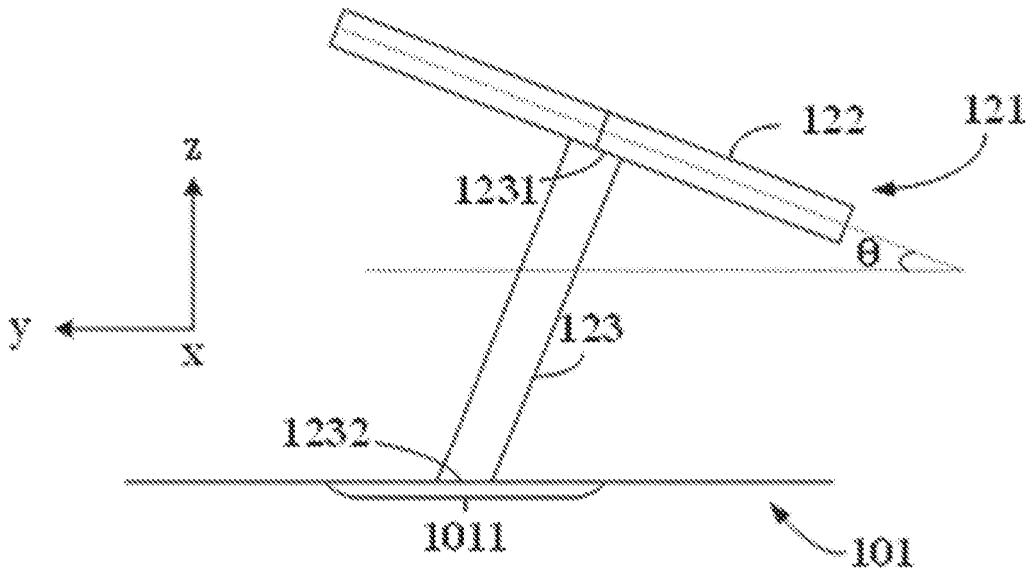
Figure 4D:
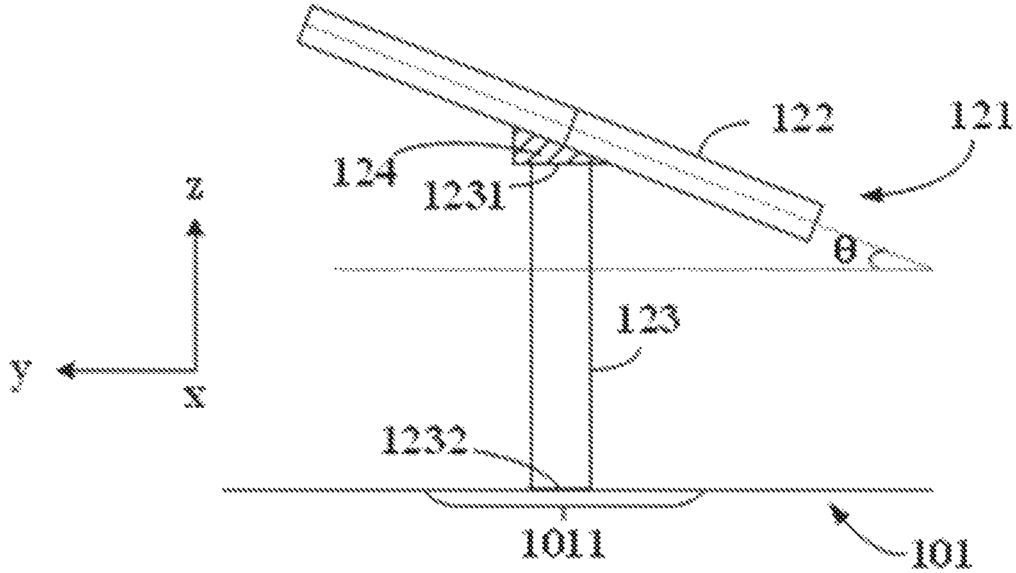
Figure 4E:
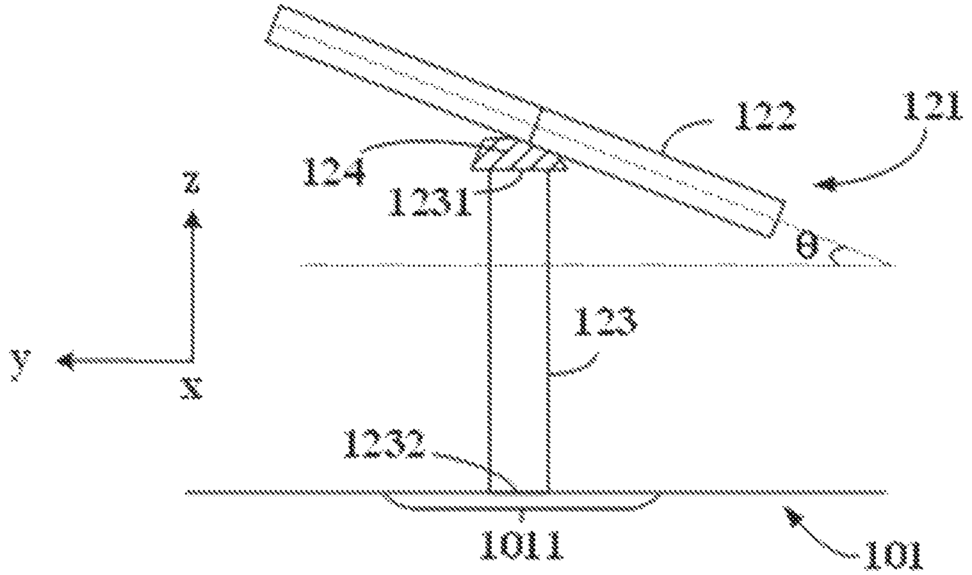
Figure 4F:
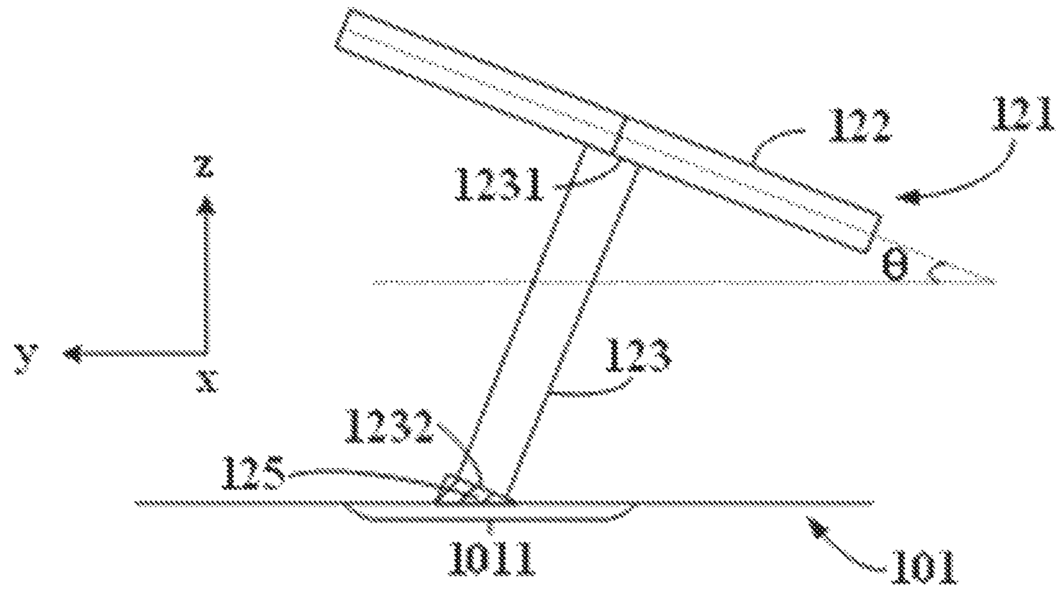
Figure 4G:
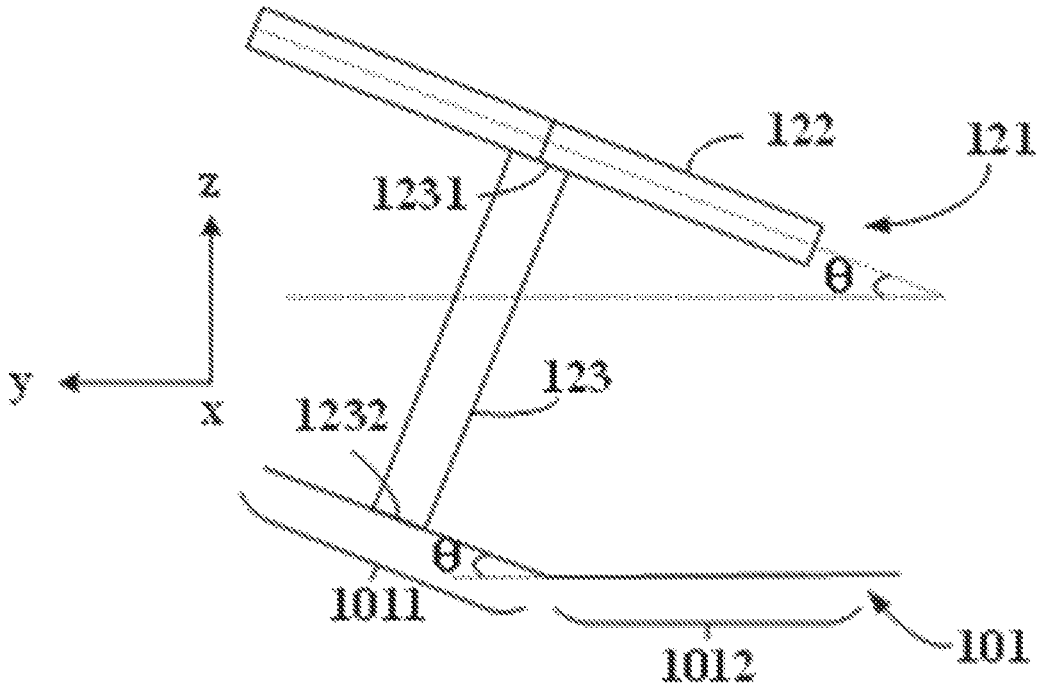
Figure 4H:
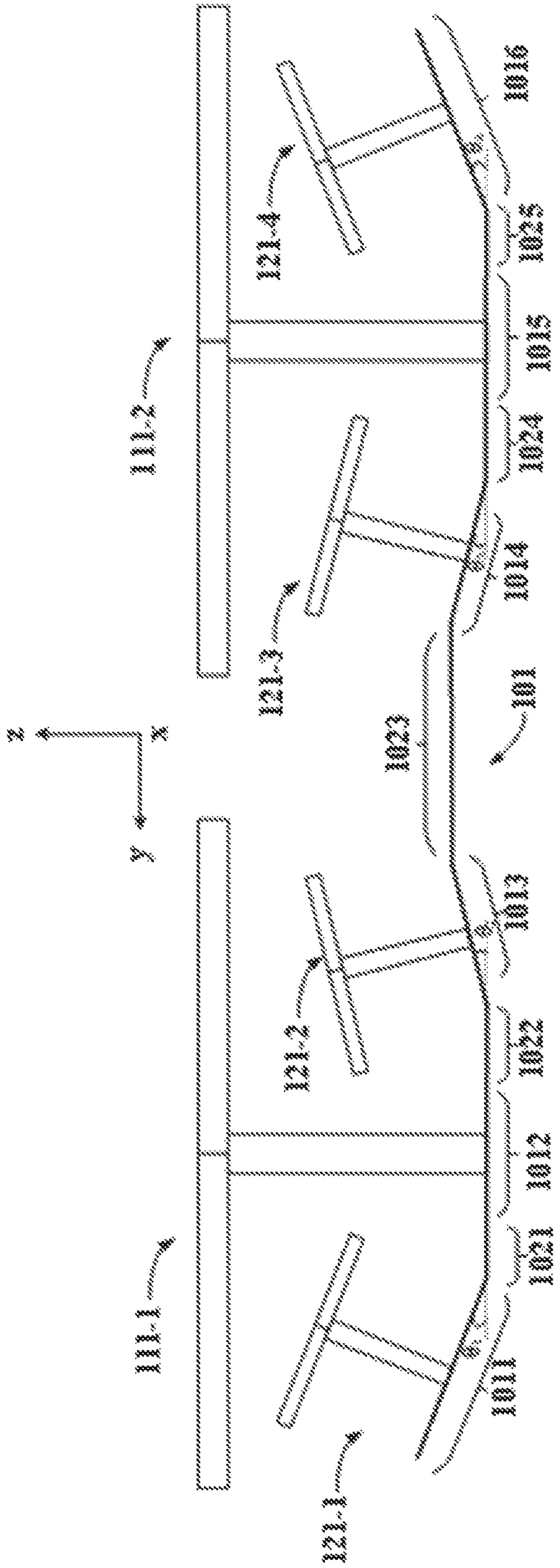

In some embodiments, the dipoles of the second radiating elements in each second column are tilted around the first direction toward the direction of the nearest first column. As discussed above, the beam pattern of the high-band radiating element is prone to be affected by the low-band radiating element and deviates toward the direction where no low-band radiating element is present, thereby undesirably affecting the performance of the base station antenna. In order to counteract such squint, the high-band radiating element can be tilted around the first direction toward the low-band radiating element. For example, as shown in FIG. 4H described later, the dipoles of the second radiating elements in each second column are respectively tilted around the x direction toward the direction in which the nearest corresponding first column is located.

In some embodiments, the dipoles of the radiating elements in at least the outermost second columns may be tilted in the manner described above. For example, referring back to FIGS. 1 and 2, the second columns 120-1 and 120-4 are the outermost columns of radiating elements, and the dipoles of at least some of the second radiating elements 121 in the second columns 120-1 and/or 120-4 are tilted around the x direction. In addition, in some embodiments, the dipoles of the second radiating elements in other of the second columns may also be tilted around the x direction. Besides, in some embodiments, the dipoles of the first radiating elements in at least one of the one or more first columns in the base station antenna 100 may also be tilted. It should be understood that the choice may be made about whether to tilt the dipoles of the radiating element and to further determine the inclination angle and orientation according to the correction requirements for the azimuth beam squint of the beam pattern of each radiating element.

In some embodiments, the angle and/or orientation at which the dipoles of the second radiating elements in the at least one second column are tilted around the first direction depends on the difference between the pointing direction of the main beam radiated by the second radiating elements and the normal direction of the base station antenna in the azimuth plane when the dipoles are not tilted.

Figure 7A:
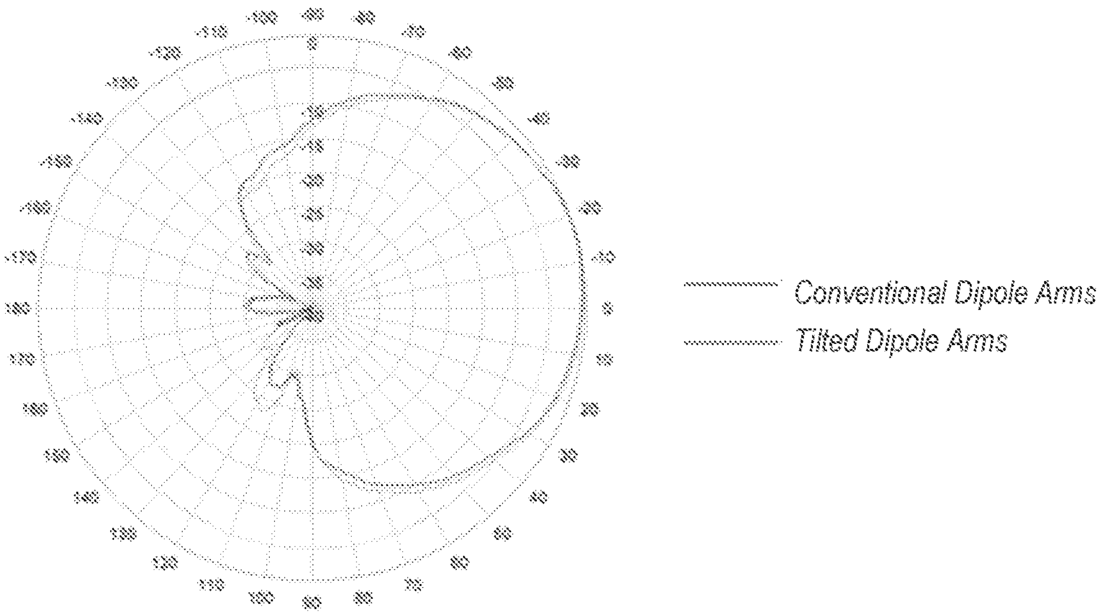
FIGS. 7A and 7B show the azimuth beam pattern of a radiating element with tilted dipoles and the azimuth beam pattern of a radiating element with conventional dipoles.
Figure 7B:
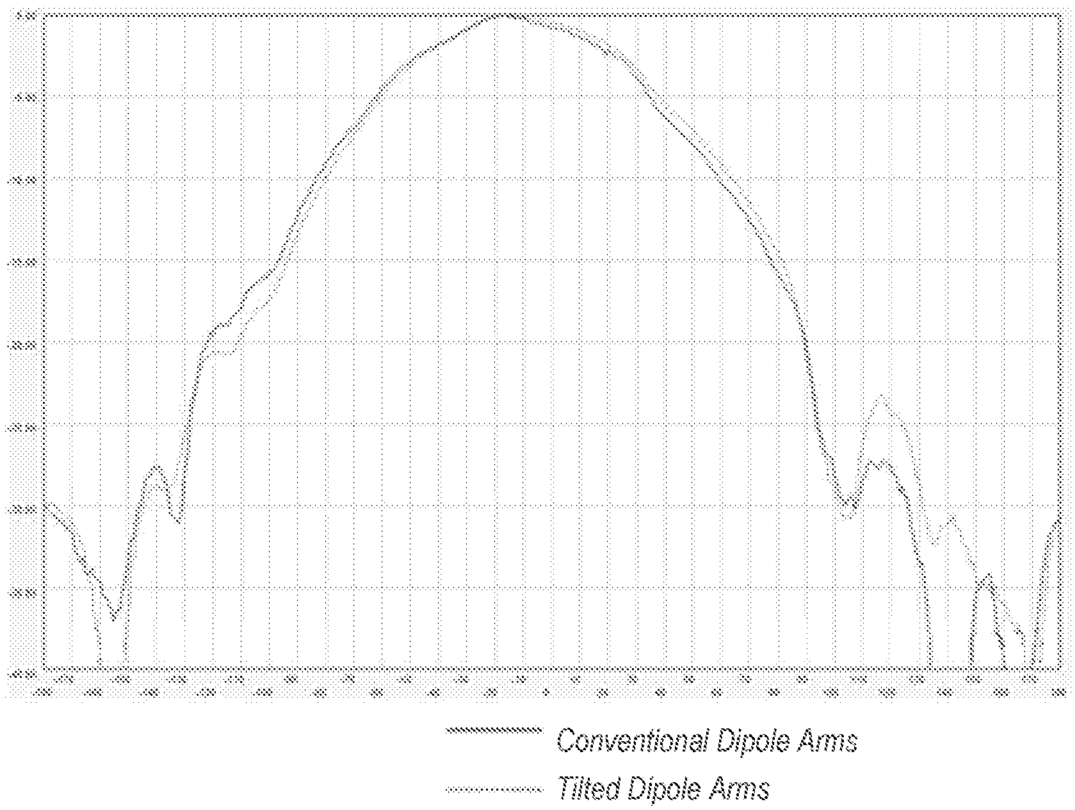

FIGS. 7A and 7B show the azimuth beam pattern measured at 1695 MHz respectively when the second radiating elements in the second column 120-1 of the base station antenna 100 have tilted dipoles as well as when the second radiating elements in the second column 120-1 of the base station antenna 100 have conventional dipoles. The solid line represents the azimuth beam pattern when the second radiating elements have conventional dipoles, which are parallel to the x-y plane, and the dashed line represents the azimuth beam pattern when the second radiating elements have titled dipoles, which are tilted by 5° around the x direction toward the first column 110-1. It can be seen from the solid line that when the dipoles of the radiating elements are parallel to the x-y plane, the 10 dB azimuth beam squint of the azimuth beam pattern is about −12.5°. It is generally believed that the absolute value of the 10 dB azimuth beam squint should not exceed 12° at the worst, that is, it is generally held that 10 dB azimuth beam squint whose absolute value exceeds 12° is unacceptable for many base station antenna applications. It can be seen from the dotted line that when the dipoles of the radiating elements are tilted by 5° toward the first column 110-1 around the x direction, the 10 dB azimuth beam squint of the azimuth beam pattern is about −7.5°, which falls within the acceptable 10 dB azimuth beam squint range, thereby improving the azimuth beam pattern. The angle and/or orientation at which the dipoles of the radiating elements are tilted around the first direction can be set according to actual needs. For example, the angle at which the dipoles are tilted around the first direction may not exceed 10°, or not exceed 5°, or not exceed 2.5°. In some embodiments, the angle and/or orientation at which the dipoles of the second radiating elements in any given second column are tilted around the first direction may be set such that the difference between the pointing direction of the main beam radiated by the second radiating elements and the normal direction of the base station antenna in the azimuth plane does not exceed 12°.

Several exemplary configurations in which the dipoles are tilted with respect to the x-y plane around the x-axis will be described in detail below with reference to FIGS. 4A to 4H. In particular, FIGS. 4A-4H illustrate various different ways of implementing radiating elements having tilted dipoles that can be used in the base station antennas according to embodiments of the present disclosure.

In some embodiments, the support stalk of the second radiating element has an inclined top surface, and the dipoles of the second radiating element are mounted on this inclined top surface. For example, as shown in FIG. 4A and FIG. 4B, the second radiating element 121 is mounted on the portion 1011 of the reflector 101 via its support stalk 123, where the support stalk 123 has a top surface 1231 and a bottom surface 1232, and the dipoles 122 of the second radiating element 121 are mounted on the top surface 1231 of the support stalk 123. The top surface 1231 of the support stalk 123 may be inclined so that the dipoles 122 mounted thereon may be tilted by a desired angle θ.

In some embodiments, the inclined top surface includes one or more sloped portions, each sloped portion having a corresponding inclination angle and orientation, wherein the dipoles of the second radiating element are installed on one of the one or more sloped portions. In some examples, the inclined top surface may include a single sloped portion, that is, the top surface 1231 of the support stalk 123 may be a plane with a constant inclination angle, for example, as shown in FIG. 4A. In some examples, the top surface 1231 of the support stalk 123 may be an inclined surface including a plurality of sloped portions, and each sloped portion may have a corresponding inclination angle and orientation, for example, as shown in FIG. 4B. The inclination angle and/or orientation of each sloped portion can be specifically designed according to actual needs, so as to provide the desired inclination angle θ for the dipoles of the second radiating elements with different requirements of azimuth beam squint correction. Such a support stalk 123 can have better versatility and installation flexibility. For example, such an inclined top surface 1231 that includes a plurality of sloped portions may include, but not limited to, any suitable regular or irregular polyhedron outer surface or part thereof. In addition, the cross-sectional shape of the support stalk 123 is not particularly limited by the present disclosure, and can be specifically configured as required. Also, the support stalk 123 does not necessarily need to have a constant cross section along its length. For example, in the case where the support stalk 123 includes an inclined surface having a plurality of sloped portions, the support stalk 123 may have a larger cross section at its top end than its bottom end, which thereby provides sufficient area for these sloped portions respectively, and/or may allow for more sloped portions, and so on.

Furthermore, in some embodiments, the support stalk of the second radiating element may have an inclined bottom surface, and the second radiating element is mounted on the front surface of the reflector via this inclined bottom surface. For example, as shown in FIG. 4C, the second radiating element 121 is mounted on the portion 1011 of the reflector 101 via its support stalk 123, where the support stalk 123 has a top surface 1231 and a bottom surface 1232, and the dipoles 122 of the second radiating element 121 are mounted to the top surface 1231 of the support stalk 123. The bottom surface 1232 of the support stalk 123 may be inclined so that the support stalk 123 is obliquely installed on the reflector 101 in a non-vertical manner, thereby tilting the dipoles 122 that are mounted on the top surface 1231 of the support stalk 123 able by a desired angle θ.

In some embodiments, the inclined bottom surface includes one or more sloped portions, each of which has a corresponding inclination angle and orientation, where the second radiating element is mounted on the front surface of the reflector via one of the said one or more sloped portions. In some examples, the inclined bottom surface may include a single sloped portion, that is, the bottom surface 1232 of the support stalk 123 may be a plane with a constant inclination angle, for example, as shown in FIG. 4C. In some examples, the bottom surface 1232 of the support stalk 123 may include a plurality of sloped portions, each of which may have a corresponding inclination angle and orientation. The inclination angle and/or orientation of each sloped portion can be specifically designed according to actual needs, so as to provide a desired inclination angle θ for the dipoles of the second radiating elements with different requirements of azimuth beam squint correction. The specific configuration of the inclined bottom surface 1232 comprising a plurality of sloped portions may be similar to the above configuration regarding the inclined top surface 1231 including a plurality of sloped portions, so the details are not described here.

In addition, in some embodiments, the second radiating elements may include an inclining element that is configured to tilt the dipoles thereof around the first direction.

In some embodiments, the inclining element may be a sloped element that is provided at the top surface of the support stalk, and the dipoles of the second radiating element are mounted on the support stalk via the sloped element. For example, as shown in FIG. 4D and FIG. 4E, the second radiating element 121 is mounted on the portion 1011 of the reflector 101 via its support stalk 123, and the support stalk 123 has a top surface 1231 and a bottom surface 1232. A sloped element 124 is also provided at the top surface 1231, and the dipoles 122 of the second radiating element 121 are mounted to the top surface 1231 of the support stalk 123 via the sloped element 124. The sloped element 124 is configured to provide an inclined mounting surface for the dipoles 122 so that the dipoles 122 mounted thereon can be tilted by a desired angle θ.

In some embodiments, the sloped element 124 disposed at the top surface 1231 of the support stalk 123 provides an inclined surface including one or more sloped portions, each of which has a corresponding inclination angle and orientation, wherein the second radiating element is mounted to the support stalk via one of the one or more sloped portions. In some examples, the sloped element 124 may include a single sloped portion with a constant inclination angle, for example, as shown in FIG. 4D. In some examples, the inclination angle of the sloped element 124 is adjustable. In some examples, the slope element 124 may provide an inclined surface including a plurality of sloped portions, and each sloped portion may have a corresponding inclination angle and orientation, for example, as shown in FIG. 4E. The inclination angle and/or orientation of each sloped portion can be specifically designed according to actual needs, so as to provide the desired inclination angle θ for the dipoles of the second radiating elements with different azimuth beam squint correction requirements.

In some embodiments, the inclining element includes a sloped element provided at the bottom surface of the support stalk, and the second radiating element is mounted on the front surface of the reflector via this sloped element. For example, as shown in FIG. 4F, the support stalk 123 has a top surface 1231 and a bottom surface 1232, and a sloped element 125 is also provided at the bottom surface 1232. The second radiating element 121 is installed via the sloped element 125 to the portion 1011 of the reflector 101. The sloped element 125 is configured to provide an inclined mounting surface for the support stalk 123, so that the support stalk 123 is obliquely mounted on the reflector 101 in a non-vertical manner, thereby tilting the dipoles 122 mounted on the top surface 1231 of the support stalk 123 by a desired angle θ.

In some embodiments, the sloped element 125 provided at the bottom surface 1232 of the support stalk 123 provides an inclined surface including one or more sloped portions, each of which has a corresponding inclination angle and orientation, and the second radiating element is mounted on the front surface of the reflector via one of the sloped portions. In some examples, the sloped element 125 may include a single sloped portion with a constant inclination angle, for example, as shown in FIG. 4F. In some examples, the inclination angle of the sloped element 125 is adjustable. In some examples, the sloped element 125 may have a plurality of sloped portions, and each sloped portion may have a corresponding inclination angle and orientation. The inclination angle and/or orientation of each sloped portion can be specifically designed according to actual needs, so that it can be used to provide a desirable inclination angle θ for the dipoles of the second radiating elements with different azimuth beam squint correction requirements. The configuration of the sloped element 125 may be similar to the configuration of the sloped element 124.

In addition, the tilt of the dipoles of the second radiating element relative to the x-y plane can also be achieved by tilting the reflector on which the second radiating element is mounted. In some embodiments, the portion of the front surface of the reflector where a second column is installed is tilted around the first direction with respect to the remaining portion of the front surface of the reflector. For example, as shown in FIG. 4G, the second radiating element 121 is mounted on a portion 1011 of the reflector 101 via its support stalk 123, wherein the support stalk 123 has a top surface 1231 and a bottom surface 1232, and the dipoles 122 of the second radiating element 121 are mounted to the top surface 1231 of the support stalk 123. The portion 1011 of the reflector 101 is tilted at an angle θ around the x direction relative to the remaining portion of the reflector 101 (for example, portion 1012), so that the dipoles 122 mounted to the top surface 1231 of the support stalk 123 can be tilted by a desired angle θ.

In some embodiments, the reflector 101 may include multiple mounting parts, each of which is used to mount a corresponding radiating element, and each mounting part is configured with a corresponding inclination angle and orientation with respect to the x-y plane, so that the dipoles of the corresponding radiating element mounted thereon are tilted at a desired angle by a certain orientation around the x direction. The inclination angle of the mounting part of the radiating element that does not need to tilt the dipoles can be zero. The reflector 101 may further include a plurality of connecting parts for connecting a plurality of mounting parts, and these connecting parts may be parallel to the x-y plane. For example, as shown in FIG. 4H, the second radiating elements 121-1 to 121-4 are respectively mounted on the mounting parts 1011, 1013, 1014, and 1016 of the reflector 101, and the first radiating elements 111-1, 111-2 are respectively mounted on the mounting parts 1012 and 1015 of the reflector 101. As discussed previously, the beam patterns of the second radiating element operating in the second operating frequency band higher than the first operating frequency band are prone to be affected by the first radiating element such that the beam patterns is deflected toward a direction where the first radiating element is absent. In order to correct such squint, the dipoles of the second radiating elements in the second column can be tilted around the x direction toward the direction of the nearest first column. For example, the second radiating elements 121-1, 121-3 can be tilted to the right in FIG. 4H around the x direction, and the second radiating elements 121-2, 121-4 can be tilted to the left in FIG. 4H around the x direction. In addition, the first radiating element is disposed on only one side of the second radiating elements 121-1 and 121-4 respectively, while the first radiating element is provided on both sides of the second radiating elements 121-2 and 121-3, whose distances to the first radiating elements on both sides are different, so in some examples, the inclination angles θ1, θ4 of the second radiating element 121-1, 121-4 can be greater than the inclination angles θ2, θ3 of the second radiating elements 121-2, 121-3.

Although the dipoles of the first radiating elements 111-1 and 111-2 in FIG. 4H are not tilted, it is understood that the inclination angle and orientation of the mounting part 1012, 1015 of the first radiating element 111-1, 111-2 can be set based on actual needs, for example, according to the difference between the pointing direction of the main beam radiated by the first radiating element and the normal direction of the base station antenna when the dipoles of the first radiating element are not tilted. In FIG. 4H, the reflector 101 further includes a plurality of connecting parts 1021 to 1025 for connecting the mounting parts 1011 to 1016. It is understandable that there may be no connection part, and the mounting parts may be directly connected to each other. Additionally, it can also be understood that although FIGS. 4A to 4G discuss the configuration of the dipoles tilted relative to the x-y plane regarding the second radiating element, when the azimuth beam squint of the first radiating element needs to be corrected, the various implementation methods discussed above regarding the second radiating element are also applicable to the first radiating element.

The base station antenna according to the present disclosure suppresses beam squint by tilting the dipoles of the radiating element, thereby improving the beam pattern of the radiating element without affecting the beam pattern of other radiating elements or other properties of the base station antenna.

Some embodiments of the present disclosure provide a base station antenna which includes a reflector and a plurality of radiating elements. Each radiating element may be installed on the front surface of the reflector and has a support stalk and at least one dipole mounted to the support stalk. The plurality of radiating elements may include a plurality of first radiating elements that are configured to operate in a first operating frequency band and arranged in one or more first columns extending along the first direction; and a plurality of second radiating elements that are configured to operate in a second operating frequency band that is different from the first operating frequency band, and are arranged in one or more second columns extending along the first direction. The at least one dipole of a first of the second radiating elements in at least one of second columns of the one or more second columns may be tilted around the first direction.

In some embodiments, the support stalk of the first of the second radiating elements may have an inclined bottom surface, and the first of the second radiating elements may be mounted on the front surface of the reflector via the inclined bottom surface.

In some embodiments, the inclined bottom surface may include one or more sloped portions, each of which has a corresponding inclination angle and orientation, and the first of the second radiating elements may be mounted on the front surface of the reflector through one of the one or more sloped portions.

In some embodiments, the support stalk of the first of the second radiating elements may have an inclined top surface, and the at least one dipole of the first of the second radiating elements may be mounted to the said inclined top surface of the said support stalk.

In some embodiments, the inclined top surface may include one or more sloped portions, each of which has a corresponding inclination angle and orientation. The at least one dipole of the first of the second radiating elements may be installed to one of the one or more sloped portions.

In some embodiments, the first of the second radiating elements may include an inclining element which is configured as such that the at least one dipole of the first of the second radiating elements is tilted around the first direction.

In some embodiments, the inclining element may include a sloped element at the bottom surface of the support stalk of the first of the second radiating elements, and the first of the second radiating elements may be mounted on the front surface of the reflector through the sloped element.

In some embodiments, the sloped element may provide an inclined surface including one or more sloped portions, and each sloped portion may have a corresponding inclination angle and orientation. The first of the second radiating elements may be mounted on the front surface of the reflector through one of the one or more sloped portions.

In some embodiments, the inclination angle of the sloped element may be adjustable.

In some embodiments, the inclining element may include a sloped element provided at the top surface of the support stalk of the first of the second radiating elements, and the at least one dipole of the first of the second radiating elements may be mounted on the support stalk via the sloped element.

In some embodiments, the sloped element may provide an inclined surface including one or more sloped portions, each of which having a corresponding inclination angle and orientation. The first of the second radiating elements may be mounted on the support stalk via one of the one or more sloped portions.

In some embodiments, a part of the front surface of the reflector where the at least one second column is installed may be tilted around the first direction with respect to the remaining part of the front surface of the reflector.

In some embodiments, the at least one second column may include the outermost second column among the one or more second columns.

In some embodiments, the at least one dipole of the first of the second radiating elements may be tilted around the first direction so that a line defined by the at least one dipole of the first of the second radiating elements forms an angle with respect to a plane defined by the first direction and a second direction transverse to the first direction.

In some embodiments, each radiating element may be a crossed dipole radiating element that includes a total of two dipoles. The dipoles of the first of the second radiating elements may be tilted around the first direction, so that a plane defined by the dipoles of the first of the second radiating elements forms an angle with respect to a second direction transverse to the first direction.

In some embodiments, the at least one dipole of each first radiating element in at least one of the one or more first columns may be tilted around the said first direction.

In some embodiments, the angle and/or orientation at which the at least one dipole of the first of the second radiating elements is tilted around the first direction may depend on a difference between a pointing direction of a main beam radiated by the first of the second radiating elements and a normal direction of the base station antenna in an azimuth plane in a case where the at least one dipole is not tilted.

In some embodiments, the at least one dipole of each radiating element may be formed by a printed circuit board that is mounted to the support stalk of the radiating element.

In some embodiments, the second operating frequency band may be higher than the first operating frequency band and does not overlap with the first operating frequency band.

In some embodiments, the at least one dipole of the second radiating elements in the at least one second column may be tilted around the first direction toward a direction where a nearest first column is located.

According to another aspect of the present disclosure, a base station antenna is provided, which may include a reflector and a plurality of radiating elements. Each radiating element may be mounted on a front surface of the reflector and may have a support stalk and a pair of dipoles mounted to the support stalk. The plurality of radiating elements may include: a plurality of low-band radiating elements that are configured to operate in a low-frequency band and arranged in one or more first columns extending along a first direction; and a plurality of high-band radiating elements that are configured to operate in a high-frequency band higher than the low-frequency band, and are arranged in one or more second columns extending along the first direction. The dipoles of the high-band radiating elements in at least one of the one or more second columns may be tilted around the first direction toward a direction where a nearest first column is located.

The terms "left", "right", "front", "rear", "top", "bottom", "upper", "lower", "high", "low" in the descriptions and claims, if present, are used for descriptive purposes and not necessarily used to describe constant relative positions. It should be understood that the terms used in this way are interchangeable under appropriate circumstances, so that the embodiments of the present disclosure described herein, for example, can operate on other orientations that differ from those orientations shown herein or otherwise described. For example, when the device in the drawing is turned upside down, features that were originally described as "above" other features can now be described as "below" other features. The device can also be oriented in other ways (rotated by 90 degrees or in other orientations), and the relative spatial relationship will be construed accordingly.

In the descriptions and claims, when an element is referred to as being "above" another element, "attached" to another element, "connected" to another element, "coupled" to another element, "mounted" to another element, or "contacting" another element ", the element may be directly above another element, directly attached to another element, directly connected to another element, directly coupled to another element, directly mounted to another element, or directly contacting another element, or there may be one or multiple intermediate elements. In contrast, if an element is described "directly" "above" another element, "directly attached" to another element, "directly connected" to another element, "directly coupled" to another element, "directly mounted" to another element or "directly contacting" another element, there will be no intermediate elements. In the descriptions and claims, a feature that is arranged "adjacent" to another feature, may denote that a feature has a part that overlaps an adjacent feature or a part located above or below the adjacent feature.

As used herein, the word "exemplary" means "serving as an example, instance, or illustration" rather than as a "model" to be copied exactly. Any implementation method described exemplarily herein is not necessarily interpreted as being preferable or advantageous over other implementation methods. Moreover, the present disclosure is not limited by any expressed or implied theory given in the technical field, background art, contents of the invention, or specific implementation methods.

As used herein, the word "basically" means including any minor changes caused by design or manufacturing defects, device or component tolerances, environmental influences, and/or other factors. The word "basically" also allows the gap from the perfect or ideal situation due to parasitic effects, noise, and other practical considerations that may be present in the actual implementation.

In addition, for reference purposes only, "first", "second" and similar terms may also be used herein, and thus are not intended to be limiting. For example, unless the context clearly indicates, the words "first", "second" and other such numerical words involving structures or elements do not imply a sequence or order.

It should also be understood that when the term "include/comprise" is used in this text, it indicates the presence of the specified feature, entirety, step, operation, unit and/or component, but does not exclude the presence or addition of one or more other features, entireties, steps, operations, units and/or components and/or combinations thereof.

In the present disclosure, the term "provide" is used in a broad sense to cover all ways of obtaining an object, so "providing an object" includes but not limited to "purchase", "preparation/manufacturing", "arrangement/setting", "installation/assembly", and/or "order" of the object, etc.

As used herein, the term "and/or" includes any and all combinations of one or more of the associated listed items. The terms used herein are only for the purpose of describing specific embodiments, and are not intended to limit the present disclosure. As used herein, the singular forms "a", "an" and "the" are also intended to include the plural forms, unless the context clearly dictates otherwise.

Those skilled in the art should realize that the boundaries between the above operations are merely illustrative. Multiple operations can be combined into a single operation, which may be distributed in the additional operation, and the operations can be executed at least partially overlapping in time. Also, alternative embodiments may include multiple instances of specific operations, and the order of operations may be changed in other various embodiments. However, other modifications, changes and substitutions are also possible. Aspects and elements of all embodiments disclosed above may be combined in any manner and/or in conjunction with aspects or elements of other embodiments to provide multiple additional embodiments. Therefore, the description and drawings hereof should be regarded as illustrative rather than restrictive.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the claims attached.

What is claimed is:

1. A base station antenna, including:

a reflector; and a plurality of radiating elements, each of which is mounted forwardly on a front surface of the reflector and has a support stalk and at least one dipole mounted to the support stalk, wherein the plurality of radiating elements include:

a plurality of first radiating elements that are configured to operate in a first operating frequency band and arranged in one or more first columns extending along a first direction; and a plurality of second radiating elements that are configured to operate in a second operating frequency band different from the first operating frequency band and arranged in one or more second columns extending along the first direction, wherein the at least one dipole of a first of the second radiating elements in at least one of second columns of the one or more second columns is tilted around the first direction, and wherein at least one inclined surface is provided between the front surface of the reflector and the at least one dipole of the first of the second radiating elements, and the at least one inclined surface inclines the at least one dipole with respect to a portion of the reflector that is behind the first of the second radiating elements.

2. The base station antenna according to claim 1, wherein the at least one inclined surface is an inclined bottom surface of the support stalk of the first of the second radiating elements and the first of the second radiating elements extends forwardly from the front surface of the reflector via the inclined bottom surface.

3. The base station antenna according to claim 2, wherein the inclined bottom surface includes one or more sloped portions, each of which has a corresponding inclination angle and orientation, and wherein the first of the second radiating elements extends forwardly from the front surface of the reflector via one of the one or more sloped portions.

4. A base station antenna, including:

a reflector; and a plurality of radiating elements, each of which is mounted forwardly on a front surface of the reflector and has a support stalk and at least one dipole mounted to the support stalk, wherein the plurality of radiating elements include:

a plurality of first radiating elements that are configured to operate in a first operating frequency band and arranged in one or more first columns extending along a first direction; and a plurality of second radiating elements that are configured to operate in a second operating frequency band different from the first operating frequency band and arranged in one or more second columns extending along the first direction, wherein the at least one dipole of a first of the second radiating elements in at least one of second columns of the one or more second columns is tilted around the first direction, wherein the support stalk of the first of the second radiating elements has an inclined top surface, and the at least one dipole of the first of the second radiating elements is mounted to the inclined top surface of the support stalk.

5. The base station antenna according to claim 4, wherein the inclined top surface includes one or more sloped portions, each of which has a corresponding inclination angle and orientation, and wherein the at least one dipole of the first of the second radiating elements is mounted to one of the one or more sloped portions.

6. The base station antenna according to claim 1, wherein the at least one dipole of the first of the second radiating elements is oblique to the reflector.

7. A base station antenna, including:

a reflector; and a plurality of radiating elements, each of which is mounted forwardly on a front surface of the reflector and has a support stalk and at least one dipole mounted to the support stalk, wherein the plurality of radiating elements include:

a plurality of first radiating elements that are configured to operate in a first operating frequency band and arranged in one or more first columns extending along a first direction; and a plurality of second radiating elements that are configured to operate in a second operating frequency band different from the first operating frequency band and arranged in one or more second columns extending along the first direction, wherein the at least one dipole of a first of the second radiating elements in at least one of second columns of the one or more second columns is tilted around the first direction, wherein the first of the second radiating elements further comprises an inclining element, which is configured such that the at least one dipole of the first of the second radiating elements is tilted around the first direction, and wherein the inclining element comprises a sloped element provided at a top surface or a bottom surface of the support stalk of the first of the second radiating elements, and the first of the second radiating elements is mounted forwardly on the front surface of the reflector via the sloped element.

8. The base station antenna according to claim 7, wherein the sloped element provides an inclined surface including one or more slope portions, each of which has a corresponding inclination angle and orientation, and wherein the first of the second radiating elements is mounted forwardly on the front surface of the reflector via one of the one or more sloped portions.

9. The base station antenna according to claim 7, wherein an inclination angle of the sloped element is adjustable.

10. The base station antenna according to claim 1, wherein a part of the front surface of the reflector where the one or more second columns is installed is oblique relative to the remaining part of the front surface of the reflector.

11. The base station antenna according to claim 1, wherein the at least one dipole of the first of the second radiating elements is oblique to the reflector so that a line defined by the at least one dipole of the first of the second radiating elements forms an angle with respect to a plane defined by the first direction and a second direction transverse to the first direction.

12. The base station antenna according to claim 1, wherein each radiating element is a cross dipole radiating element that includes a total of two dipoles, and wherein the dipoles of the first of the second radiating elements are oblique to the reflector so that a plane defined by the dipoles of the first of the second radiating element forms an angle relative to a second direction transverse to the first direction.

13. The base station antenna according to claim 1, wherein the at least one dipole of each first radiating element in at least one of the one or more first columns are oblique to the reflector.

14. The base station antenna according to claim 1, wherein an angle and/or orientation at which the at least one dipole of the first of the second radiating elements is oblique to the reflector depends on a difference between a pointing direction of a main beam radiated by the first of the second radiating elements and a normal direction of the base station antenna in an azimuth plane in a case where the at least one dipole is not tilted.

15. The base station antenna according to claim 1, wherein the at least one dipole of each radiating element is formed of a printed circuit board, which is mounted to the support stalk of the radiating element.

16. The base station antenna according to claim 1, wherein the second operating frequency band is higher than the first operating frequency band and does not overlap with the first operating frequency band.

17. A base station antenna, including comprising:

a reflector; and a plurality of radiating elements, each of which extends forwardly from a front surface of the reflector and has a support stalk and a pair of dipoles mounted to the support stalk, wherein the plurality of radiating elements include:

a plurality of low-band radiating elements that are configured to operate in a low-frequency band and arranged in one or more first columns extending along a first direction; and a plurality of high-band radiating elements that are configured to operate in a high-frequency band higher than the low-frequency band, and arranged in one or more second columns extending along the first direction, wherein the reflector has a flat surface and all of the radiating elements in the plurality of radiating elements are mounted to extend forwardly from the flat surface, and wherein the dipoles of the high-band radiating elements in at least one second column of the one or more second columns are oblique to the flat surface.

* * * * *